Dec. 6, 1938.     F. A. JONES     2,138,970
GASOLINE DUMP DEVICE FOR AIRPLANES
Filed March 10, 1938     3 Sheets-Sheet 1
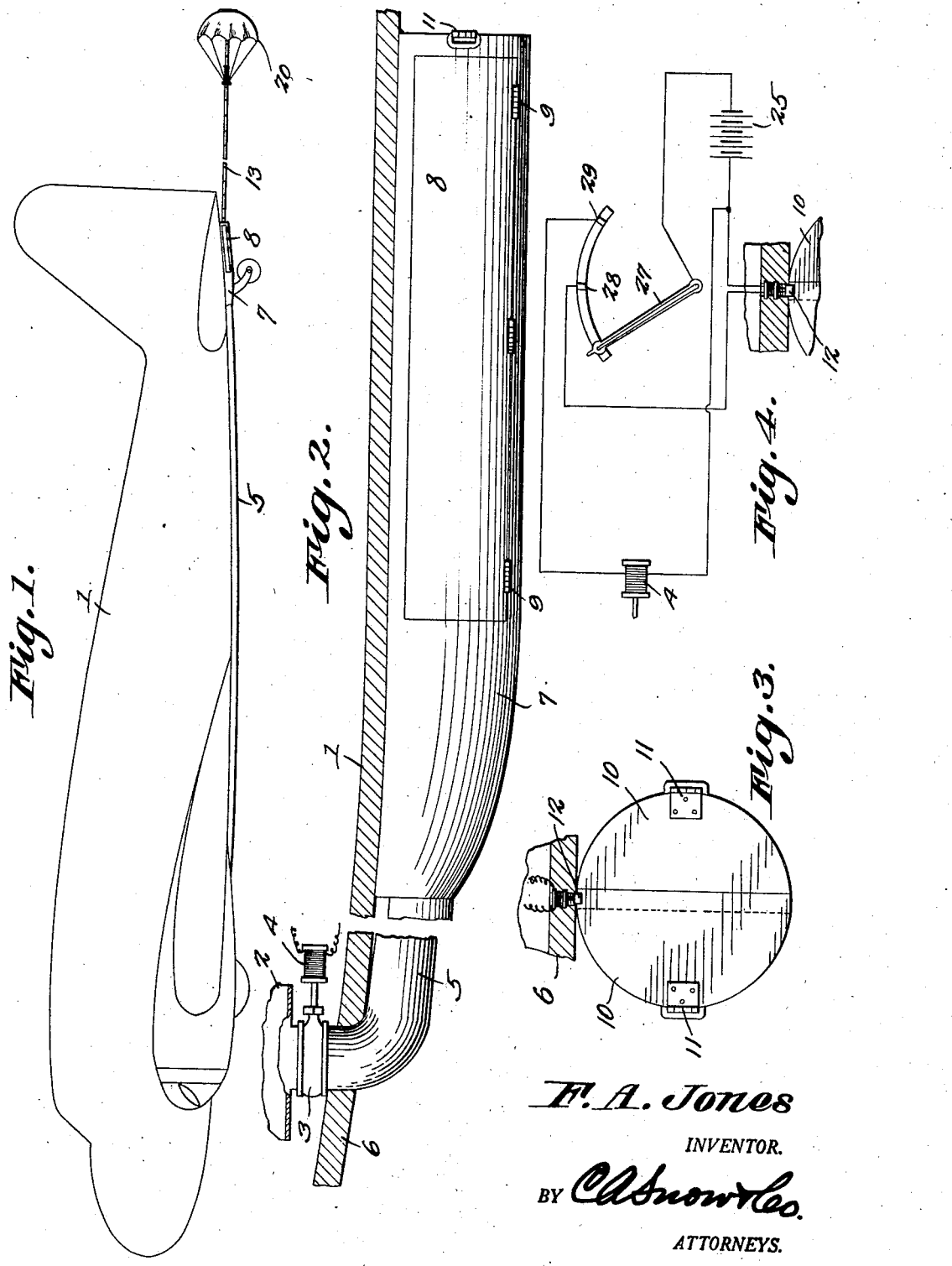
F. A. Jones
INVENTOR.
BY C A Snow & Co.
ATTORNEYS.

Dec. 6, 1938.　　　　F. A. JONES　　　　2,138,970
GASOLINE DUMP DEVICE FOR AIRPLANES
Filed March 10, 1938　　　3 Sheets-Sheet 2
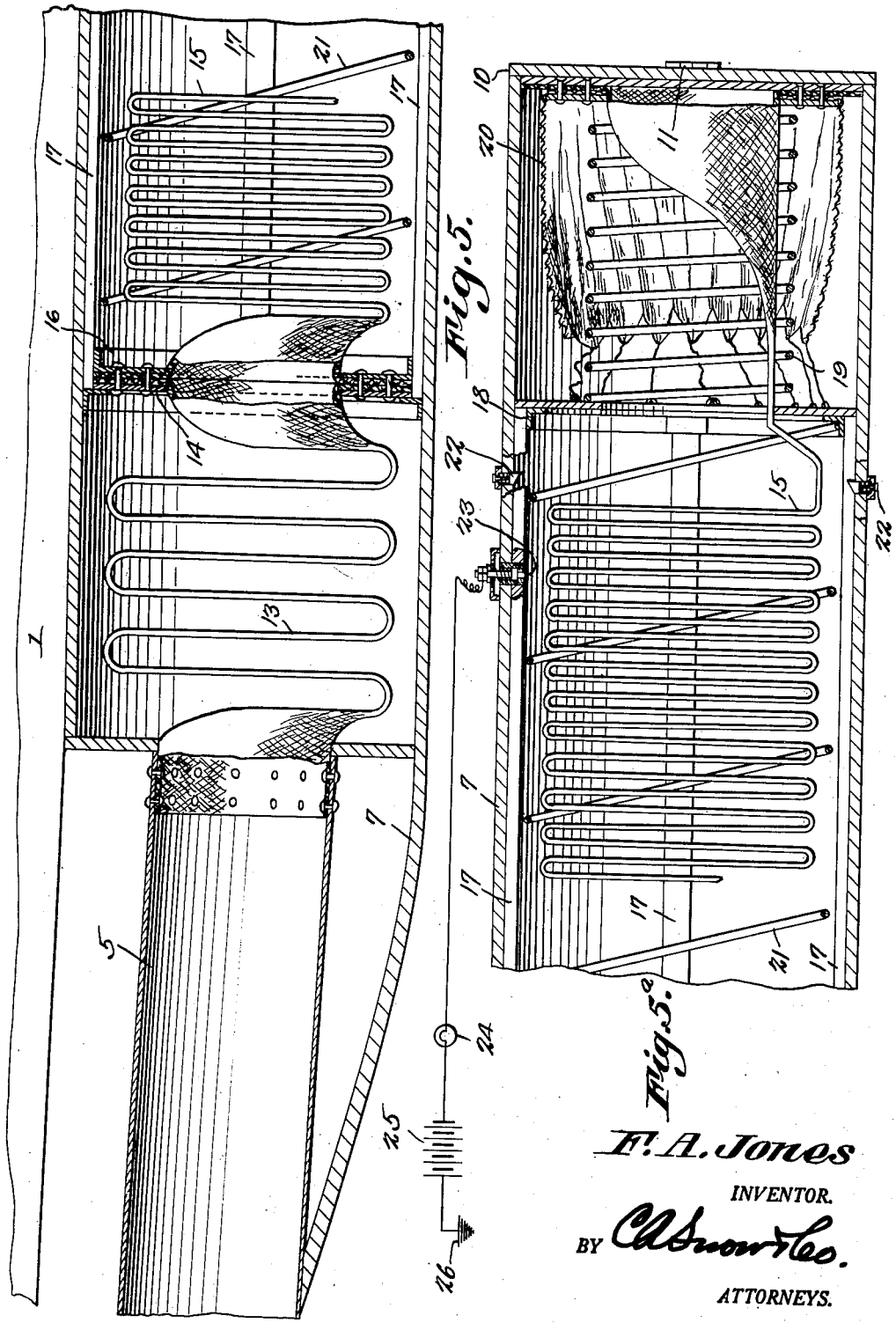
F. A. Jones
INVENTOR.
BY
ATTORNEYS.

Dec. 6, 1938.  F. A. JONES  2,138,970
GASOLINE DUMP DEVICE FOR AIRPLANES
Filed March 10, 1938  3 Sheets-Sheet 3
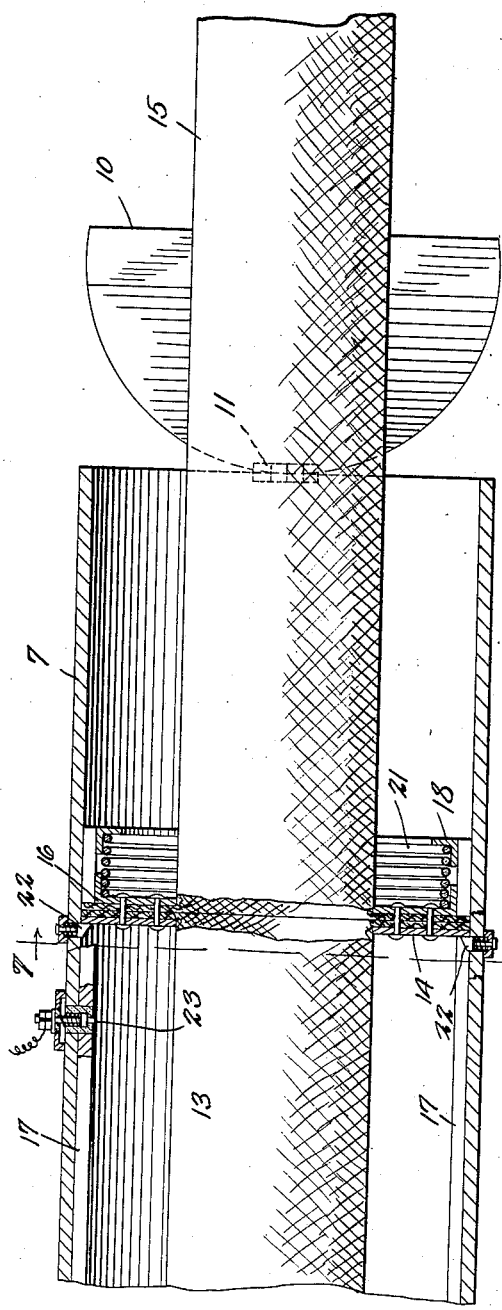
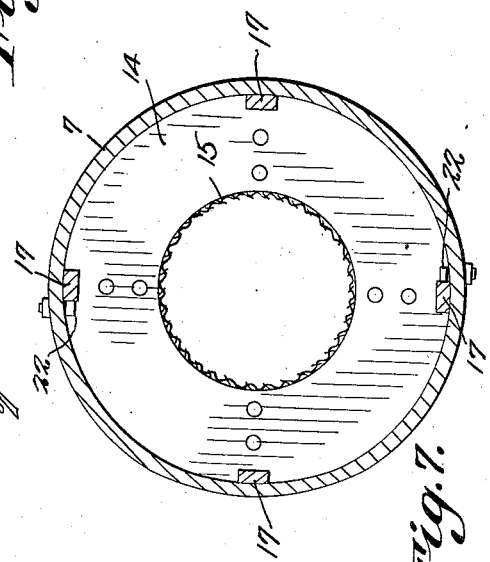
F. A. Jones
INVENTOR.
BY C. A. Snow & Co.
ATTORNEYS.

Patented Dec. 6, 1938

2,138,970

UNITED STATES PATENT OFFICE 2,138,970

GASOLINE DUMP DEVICE FOR AIRPLANES

Fred Alvin Jones, Newark, N. J.

Application March 10, 1938, Serial No. 195,148

10 Claims. (Cl. 244—136)

This invention relates to improvements in gasoline dump devices for airplanes, and more particularly to a device incorporated in an airplane and operable by the pilot when it is desired to quickly dump the fuel from the fuel tank in the plane.

An object of the invention is to provide an improved dump device for the fuel tanks of an airplane, which will be incorporated in a suitable casing or housing positioned below the body of the airplane, whereby a section of fuel tubing may be withdrawn from the casing or housing to dump the fuel at a distance remote from the airplane.

Another object of the invention is to provide an improved fuel dump device for airplanes which will be secured to the under surface of the body of the airplane, and which may be operated by the pilot to quickly extend a long section of fuel tubing from the casing in which it is contained, and when the tubing has been fully extended, a visual signal will be automatically illuminated at a point near the pilot, at which time he may press a switch to close the circuit which will open the dump valve from the fuel tank.

A still further object of the invention is to provide a fuel dump device for airplanes which will be contained in a suitable casing attached to the bottom of the airplane body, and which will include a section of coiled fuel tubing to which a folded parachute will be attached, whereby, when a pilot desires, the doors at the rear end of the casing may be opened and the parachute and tubing pushed from the casing into the slip stream of the airplane which will strike against the parachute thus quickly drawing the tube from the casing to its extended position.

Another object of the invention is to provide a fuel dump device for airplanes which will be received within a casing positioned below the body of an airplane and which will house a considerable length of fuel tubing to which a parachute is attached, the outermost portion of the tubing being so arranged that it may be discharged by spring pressure from within the casing, and the further provision of shock absorbing means to take up the shock when the tubing has reached its outermost or extended position.

Other objects will appear as the description proceeds.

In the accompanying drawings which form a part of my application,

Figure 1 is a side elevation of an airplane equipped with my improved fuel dump device;

Figure 2 is a side elevation of the casing in which my improved fuel dump device is housed, showing the position of the same with respect to the fuel tank and dump valve thereof;

Figure 3 is a rear view of the doors at the rear end of the casing in which my improved fuel dump device is housed;

Figure 4 is a diagrammatic view of the circuit for unlocking the doors at the end of the casing, and for operating the electric dump valve;

Figure 5 is a vertical sectional view through the forward end of the casing in which my improved dump device is received, showing the fuel tubing coiled therein, and showing the gasket to which the forward end of the tubing is attached and the shock absorbing spring;

Figure 5a is a vertical sectional view through the rear end of the casing in which my fuel dump device is housed, showing the resilient means and parachute dischargeable by said resilient means when the rear doors of the casing are opened;

Figure 6 is a vertical sectional view taken through the rear end of the casing showing the fuel tubing extending therefrom in distended position, and Figure 7 is a transverse sectional view taken on the line 7—7 of Figure 6.

Like characters of reference are used throughout the following specification and the accompanying drawings to designate corresponding parts.

I have illustrated my improved dump device for fuel tanks attached to a monoplane 1. The fuel tank 2 of the airplane 1 will be located in any desired position, and will be equipped with a dump discharge valve 3 operated by the magnet 4 from a position adjacent to the pilot's seat in the airplane.

An aluminum feeder tube 5 will be secured to the dump valve 3 and will extend through the floor 6 of the airplane 1 and in close proximity to the bottom of the plane to a point adjacent the rear end thereof, where it is connected with the casing 7 in which my improved dump mechanism is housed. A suitable door 8 will be hinged at 9 in the casing 7 in order that access may be had to the interior thereof when it is necessary to repack the fuel tubing or line after the same has been in distended position. A pair of cooperating doors 10 will be hinged at 11 to close the rear end of the casing 7 when the fuel dump device is not actually being used, and will be held in closed position by means of the electrically or magnetically operated latch mechanism 12, which may be energized from a point adjacent the pilot's seat when it is desired to extend the fuel tubing from the casing.

The fuel tubing or hose 13 will be attached to the rear end of the feeder tube 5 as illustrated in Figure 5 of the drawings and will have a gasket 14 at its opposite end. The inner end of the main section of fuel tubing 15 will be clamped with the adjacent end of the fuel tubing 12 between the spaced plates of the gasket 14, thus forming a liquid-tight joint between the two sections of tubing. The gasket 14 is flanged as at 16 so that the same may readily slide within the casing 7 on suitable track 17. The section 15 of the fuel tubing will be at least twenty-five feet in length, so that when the same is in distended position it will be sufficiently far from the body of the airplane so that the fuel being dumped will not spray over the plane, thus reducing the fire hazard to a minimum.

A second gasket 18 will be positioned within the casing 7 at a point near the rear end thereof and is held in position by means of the latch mechanism 22 as will be seen from the drawings. The gasket 18 is open at its central portion to permit the fuel tubing 15 to be pulled from the casing when the fuel from the fuel tank is to be dumped. A coiled spring 19 will be superimposed about the fuel tubing 15 whereby when the doors 10 are opened the parachute 20 attached to the outer end of the fuel tubing 15 will be snapped out of the casing 7 until it reaches a point in the slip stream from the airplane at which time the air from the slip stream will whip the fuel tubing 15 out to its outermost distended position. It will be understood that the springs 19 will be compressed when the doors 10 of the casing are closed.

A coiled spring 21 will be positioned about the fuel tubing 15 within the casing 7 between the gaskets 14 and 18, and when the tubing 15 is snapped from said casing, the movement of the gasket 14 in a rearward direction will compress the spring 21 against the gasket 18, thereby acting as a shock absorber, and at the same time when the gasket 14 reaches a point adjacent the gasket 18, it will slip by the spring latch members 22, and be held from further movement, which position is illustrated clearly in Figure 6 of the drawings.

As the gasket 14 travels backwardly in the casing 7, it will engage a switch 23 positioned in the casing 7 and will cause the same to close a circuit to a light 24 located adjacent the pilot in the cockpit of the airplane 1. A suitable source of current 25 will be utilized for illuminating the lamp 24 and my comprise one or more batteries or other suitable source of electrical energy. One side of the battery 25 will be grounded to the frame of the airplane as at 26.

In Figure 4 of the drawings, I have illustrated a switch mechanism 27 which will be located adjacent the pilot of the airplane and will have two contacts 28 and 29, contact 28 controlling the magnetic latch mechanism which holds the doors at the rear end of the casing closed, which may be opened when the circuit is closed to the magnetic latch mechanism. After the pilot has opened the doors of the casing 7 and the fuel tubing has been extended to its furthermost position, and the visual signal illuminated in the cockpit, he will turn the switch 27 to contact point 29 thereby energizing the magnet 4 which opens the fuel duct valve between the fuel tank 2 and the feeder tube 5.

From the foregoing description it will be apparent that I have devised a highly efficient form of fuel dump mechanism which will be carried in a casing at the bottom of an airplane body, and which in case of necessity, such as a forced landing over a location where it is impossible to reach a landing field, the fuel may be quickly dumped from the fuel tank at a point remote from the airplane thereby reducing the fire hazard to a minimum. It will be further understood that it is unnecessary to retract the fuel tubing in making a landing as the effect of the extended tubing will make little to no difference in the operation and handling of the airplane.

Many minor changes in detail of construction may be resorted to without departing from the spirit of the invention.

Having thus described my invention what I claim as new and desire to secure by Letters Patent of the United States is:

1. In combination with an airplane having a fuel tank, a feeder tube connected to said tank, a dump valve between said tank and tube, a casing adjacent the airplane tail connected to the opposite end of said feeder tube, fuel tubing connected with said feeder tube housed in said casing, and means operable from the pilot's seat whereby the fuel tubing may be ejected from said casing.

2. In combination with an airplane having a fuel tank, a feeder tube connected to said tank, a dump valve between said tank and tube, a casing adjacent the airplane tail connected to the opposite end of said feeder tube, fuel tubing connected with said feeder tube housed in said casing, and resiliently tensioned means operable from the pilot's seat whereby the fuel tubing may be ejected from said casing.

3. In combination with an airplane having a fuel tank, a feeder tube connected to said tank, a dump valve between said tank and tube, a casing adjacent the airplane tail connected to the opposite end of said feeder tube, fuel tubing connected with said feeder tube housed in said casing, resilient tension means operable from the pilot's seat whereby the fuel tubing may be ejected from said casing, and means for absorbing the shock caused by the fuel tubing reaching its furthermost distended position.

4. In combination with an airplane having a fuel tank, a feeder tube connected to said tank, a dump valve between said tank and tube, a casing adjacent the airplane tail connected to the opposite end of said feeder tube, fuel tubing connected with said feeder tube housed in said casing, means operable from the pilot's seat whereby the fuel tubing may be ejected from said casing, and an indicating signal adjacent the pilot's seat operable when said fuel tube is distended to its furthermost position.

5. In combination with an airplane having a fuel tank, a feeder tube connected to said tank, a dump valve between said tank and tube operable from the pilot's seat, a casing adjacent the airplane tail connected to the opposite end of said feeder tube, fuel tubing connected with said feeder tube housed in said casing, means operable from the pilot's seat whereby the fuel tubing may be ejected from the casing, and means on said fuel tubing for withdrawing the same to its furthermost distended position.

6. In combination with an airplane having a fuel tank, a feeder tube connected to said tank, a dump valve between said tank and tube, a casing adjacent the airplane tail connected to the opposite end of said feeder tube, fuel tubing connected with said feeder tube housed in said casing, spaced gaskets in said casing, shock absorbing means between said gaskets, said fuel tubing eing attached to one of said gaskets and movable herewith, whereby when the fuel tubing is ejected from the casing, the movable gasket will be pulled towards the other gasket absorbing the shock incident to the fuel tubing reaching its furthermost distended position.

7. In combination with an airplane having a fuel tank, a feeder tube connected to said tank, a dump valve between said tank and tube, a casing adjacent the airplane tail connected to the opposite end of said feeder tube, fuel tubing connected with said feeder tube housed in said casing, spaced gaskets in said casing, shock absorbing means between said gaskets, said fuel tubing being attached to one of said gaskets and movable therewith, whereby when the fuel tubing is ejected from the casing, the movable gasket will be pulled towards the other gasket absorbing the shock incident to the fuel tubing reaching its furthermost distended position, and means for latching the movable gasket when the shock absorbing means is fully compressed.

8. In combination with an airplane having a fuel tank, a feeder tube connected to said tank, a dump valve between said tank and tube, a casing adjacent the airplane tail connected to the opposite end of said feeder tube, fuel tubing connected with said feeder tube housed in said casing, spaced gaskets in said casing, guide means for one of said gaskets, a shock absorbing means between said gasket, said fuel tubing being attached to one of said gaskets and movable therewith, whereby when the fuel tubing is ejected from the casing, the movable gasket will be pulled towards the other gasket absorbing the shock incident to the fuel tubing reaching its furthermost distended position.

9. In combination with an airplane having a fuel tank, a feeder tube connected to said tank, a dump valve between said tank and tube, a casing adjacent the airplane tail connected to the opposite end of said feeder tube, fuel tubing connected with said feeder tube housed in said casing, means through said casing through which access may be had for packing said fuel tubing, and means at the end of the casing for closing the same until opened by remote control from the pilot's seat.

10. In combination with an airplane having a fuel tank, a feeder tube connected to said tank, a dump valve between said tank and tube, a casing adjacent the airplane tail connected to the opposite end of said feeder tube, fuel tubing connected with said feeder tube and housed in said casing, resilient means for ejecting said fuel tubing beyond the end of said casing, a parachute attached to the outer end of said fuel tubing for further withdrawing the same from the casing when subjected to the air from the slip stream, and remote control means for effecting the withdrawal of the fuel tubing and for operating the dump valve at the will of the pilot.

FRED ALVIN JONES.